I. B. MYERS.
HOOK FOR CUP AND SAUCER RACKS.
APPLICATION FILED AUG. 19, 1914.

1,147,810.

Patented July 27, 1915.

Inventor
IDA B. MYERS

Witnesses
Robert M. Lutphew.
A. J. Hind.

By Watson E. Coleman
Attorney

UNITED STATES PATENT OFFICE.

IDA B. MYERS, OF CHICAGO JUNCTION, OHIO.

HOOK FOR CUP AND SAUCER RACKS.

1,147,810.     Specification of Letters Patent.     Patented July 27, 1915.

Application filed August 19, 1914. Serial No. 857,614.

*To all whom it may concern:*

Be it known that I, IDA B. MYERS, a citizen of the United States, residing at Chicago Junction, in the county of Huron and State of Ohio, have invented certain new and useful Improvements in Hooks for Cup and Saucer Racks, of which the following is a specification, reference being had to the accompanying drawings.

My invention relates to certain new and useful improvements of hooks and especially such as are used in connection with cup and saucer racks.

My invention has for its object the production of a hook such as referred to which shall be exceedingly simple and economic of construction and effective in use and with these ends in view my invention consists in the details of construction and arrangement hereinafter more fully explained.

Figure 1:
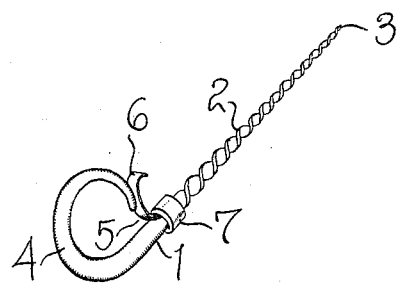
Figure 2:
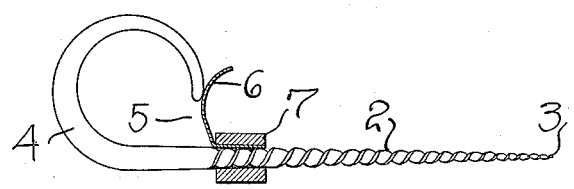
Figure 3:
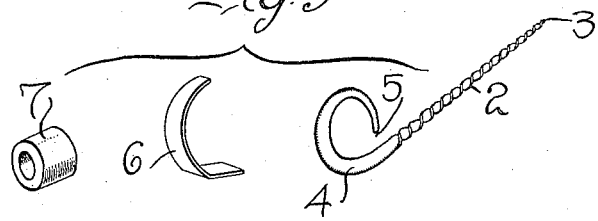

In order that those familiar with the art may know how to make and use my improved hook I will proceed to describe the same referring by numerals to the accompanying drawing in which, Figure 1 is a perspective view of a hook embodying my invention. Fig. 2 is a central vertical section on an enlarged scale, and Fig. 3, a side view of the three parts of the hook disassembled.

Similar reference numerals indicate like parts in the three figures of the drawing.

The hook 1 is preferably formed of a piece of reasonably stiff wire threaded for a portion of its length as at 2 and terminating in a gimlet point 3, the other extremity having a hook 4 terminating adjacent to the body 1 and forming a throat 5. The hook 4 constitutes also a ready means for screwing the hook as a whole into a wooden support.

6 is a flexible flat metal spring with one end bridging the throat 5 and the opposite end confined rigidly between the threaded surface of the hook and a band 7. By reference to Fig. 2 it will be seen that the interior area of the band is somewhat greater than the cross-section of the hook at the point where it is to be located, and that it has a slight taper corresponding with the taper of the hook shank 1 and the end of the spring 6 can thus be pressed into frictional contact with the threads 2 to such an extent as to firmly hold it in place. If thought desirable the interior of the band may be slightly roughened to still further coöperate with the threads of the hook in holding the spring rigidly. The outer end of the spring is turned upwardly to a slight extent in order that anything which it is desired to suspend upon the hook may be forced between the spring (which will yield) and the curved surface of the hook.

It will be seen that the three parts of my hooks are separately made and may be readily assembled and that these three parts are also separable by unscrewing the band and spring from engagement with the hook shank and by shifting the band longitudinally relative to the hook shank, and it will further be seen that the device may be readily and cheaply made.

What I claim as new and desire to secure by Letters Patent is:—

1. The combination with a hook having a screw threaded shank, of a band surrounding the shank and separable therefrom by longitudinal movement therealong, said band having an interior diameter slightly greater than the shank, and a spring tongue having one end loosely disposed between the band and shank and forced into engagement with the screw threads of the shank by means of the band, said tongue coöperating with the bill of the hook.

2. The combination with a hook having a tapered shank, of a band surrounding the shank and separable therefrom by longitudinal movement therealong and having an interior diameter slightly greater than the shank, and a spring tongue having one end loosely inserted between the band and shank and forced into engagement with the shank by the band.

3. The combination with a hook having a screw threaded tapered shank, of a band surrounding the shank and separable therefrom by longitudinal movement therealong and having an interior diameter slightly greater than the greatest diameter of the shank, and a spring tongue having one end bent and inserted between the band and shank and forced into engagement with the screw threads of the shank by the band.

4. The combination with a hook having a shank, the hook being disposed entirely to one side of the shank and having its bill extending at right angles to the shank, the shank being tapered, of an interiorly tapered band surrounding the shank and separable therefrom by longitudinal movement therealong and having an interior diameter slightly greater than the shank, and a spring tongue coacting with the bill of the hook and having an angularly bent portion inserted between the band and the shank and held in engagement with the shank by the wedging action of the band on the shank.

In testimony whereof I hereunto affix my signature in the presence of two witnesses.

IDA B. MYERS.

Witnesses:
FRANK CARPENTER,
WILLIAM MEIER.

Copies of this patent may be obtained for five cents each, by addressing the "Commissioner of Patents, Washington, D. C."